XR 2,860,265 42

X 84599

Nov. 11, 1958 W. P. MASON 2,860,265

FERROELECTRIC DEVICE

Filed June 21, 1954 2 Sheets-Sheet 1

INVENTOR
W. P. MASON
BY H. O. Wright
ATTORNEY

INVENTOR
W. P. MASON
BY
H. O. Wright
ATTORNEY

United States Patent Office 2,860,265

Patented Nov. 11, 1958

2,860,265

FERROELECTRIC DEVICE

Warren P. Mason, West Orange, N. J., assignor to Bell Telephone Laboratories, Incorporated, New York, N. Y., a corporation of New York Application June 21, 1954, Serial No. 438,166

6 Claims. (Cl. 310—9.4)

This invention relates, in general, to electromechanical transducers, and more specifically to electromechanical transducers comprising ferroelectric ceramic elements.

Certain crystalline materials, when exposed to an alternating polarizing voltage, exhibit a relationship between the electrostatic polarizing force and the polarization in the direction of the applied force that is similar to the hysteresis loops exhibited by magnetic materials. Such materials are called "ferroelectrics." Certain of these materials, termed "perovskite-type," of which barium titanate is an outstanding example, are characterized by ferroelectric activity along three mutually perpendicular axes of symmetry.

Perovskite-type crystals in ceramic form have found wide application as transducers in various types of electromechanical and acoustical systems. However, in order to derive practical amounts of electrical energy by utilizing the electrostrictive effect in such a ceramic, one must apply stresses which are of the order of its crushing stress. It has been shown that the charge developed during this process increases out of proportion to the applied stress, and that at 30,000 pounds per square inch pressure, about three times as much charge is developed as one would expect from a linear piezoelectric relation. This is believed to be caused by the change in shape of the tiny electrical units called "domains" which make up the ferroelectric material. This change in shape produces a ninety percent reversal in the direction of polarization of the ceramic. The amount of charge developed indicates that in a polarized ceramic, on the average of a third of the domains are lined up by the polarization process, and two-thirds are randomly scattered at right angles to the polarization direction.

It is the object of the present invention to improve the characteristics of electromechanical transducers including ferroelectric ceramics, and more particularly, to increase the electromechanical operating efficiency of transducers comprising ceramics, including a principal component of perovskite-type crystalline material.

In accordance with the present invention, the aforesaid object is carried out by artificially increasing the number of the electrical domains aligned in the principal direction of polarization in a ceramic comprising a material such as described in the foregoing paragraphs.

It has been found that tension in the direction of polarization, or compression normal to the direction of polarization, causes the domain walls to move so that the polarized areas become larger. Accordingly, when compressional stress is applied in a direction normal to the principal direction of polarization of a ceramic sample of the aforesaid type, the electromechanical energy converting ability of the ceramic is substantially increased. As soon as the pressure is removed, however, the piezoelectric constant begins to decrease and eventually returns to its corresponding value for given temperature and age.

The present invention proposes to increase the electromechanical transducing efficiency of a ceramic element as above characterized, by maintaining it under permanent pressure applied in a direction normal to its principal direction of polarization. In addition to increasing the electromechanical conversion efficiency, such an arrrangement also serves to insure a higher crushing strength for the ceramic. Hence, a higher percentage of the material polarizes, and a higher load capacity is simultaneously obtained. Inasmuch as high pressures, unevenly distributed, sometimes causes ceramics to fracture, moderate permanent pressures of from 5 to 10 thousand pounds per square inch are preferred for the purposes of the present invention. Several practical devices for making use of this discovery will be described in detail in the body of the specification.

One of these comprises a mounting in which pressure is applied hydraulically to a bank of ferroelectric ceramic elements, as above characterized, which are aligned so that their common axis of polarization is normal to the direction of the permanently applied pressure.

Another embodiment comprises a disk-shaped ceramic element of barium titanate or the like, polarized in a direction perpendicular to its major faces, around the periphery of which a metal collar is shrunk so as to apply pressure radially.

The invention will be better understood from a study of the detailed description hereinafter with reference to the attached drawings, of which:

Figure 1:
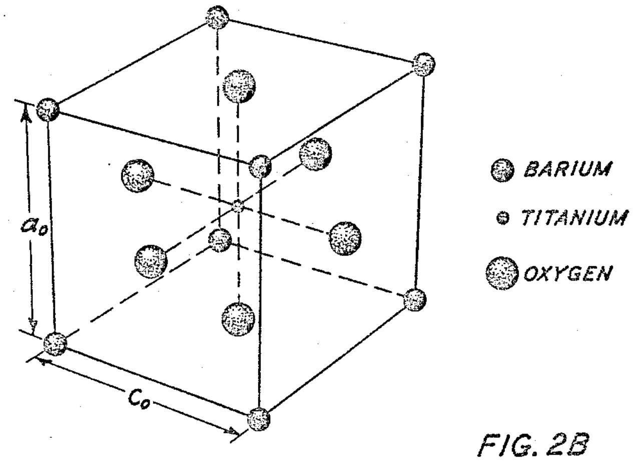
Fig. 1 shows a typical unit of crystal lattice structure of the perovskite type.

As pointed out in the early part of the specification, the teachings of the present invention apply principally to crystalline materials which are ferroelectric in three mutually perpendicular directions. In general, the lattice structure of these materials assumes a pseudo-cubic form, such as indicated in Fig. 1 of the drawings, which shows a unit of lattice structure of barium titanate, $BaTiO_3$. The barium atoms are positioned at the corners of the pseudo-cube, the titanium atom assumes a position at the center of the pseudo-cube, and the oxygen atoms O assume positions at the center of each of the faces of the pseudo-cube. This type of structure is termed "perovskite" after a so-named crystalline form of calcium titanate, $CaTiO_3$. The dimensions of the rectangle in the vertical plane of the figure, which are represented by $a_0$ in one direction and $c_0$ in a direction normal thereto, differ from each other slightly, below the Curie point, below which the crystal becomes ferroelectric. At temperatures corresponding to the Curie point and above, the dimension $a_0$ becomes equal to the dimension $c_0$ so that the structure becomes a perfect cube and ceases to be ferroelectric.

Perovskite-type crystals which are known at the present time to exhibit ferroelectric activity in three mutually perpendicular directions are indicated in the following table.

TABLE

| Substance | Formula | Crystal Habit at Room Temperature | Curie Point, Degrees Kelvin |
|---|---|---|---|
| Barium titanate | $BaTiO_3$ | tetragonal | 393 |
| Cadmium niobate (ceramics) | $Cd_2Nb_2O_7$ | cubic | 185 |
| Lead metaniobate (ceramics) | $Pb(NbO_3)_2$ | orthorhombic | 843 |
| Lead titanate (ceramics) | $PbTiO_3$ | tetragonal | 763 |
| Lithium niobate | $LiNbO_3$ | trigonal | ---------- |
| Lithium tantalate | $LiTaO_3$ | trigonal | ---------- |
| Potassium niobate | $KNbO_3$ | orthorhombic | 707 |
| Potassium tantalate | $KTaO_3$ | cubic | 13 |
| Sodium niobate | $NaNbO_3$ | orthorhombic | 753 |
| Tungsten trioxyd | $WO_3$ | triclinic | 983 |

Polycrystalline materials of the class described are processed to form ceramic elements suitable for the purposes of the present invention by mixing them with addition agents such as clay, or bentonite, forming from the mixture elements having a radius of, say, 2 inches, and a thickness between major faces of 3/8 of an inch. The elements are fired at a temperature between 2200° and 2500° Fahrenheit.

Figure 2A:
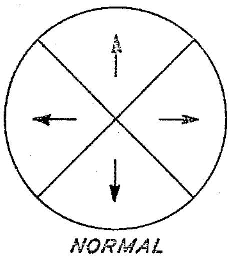
Figs. 2A and 2B illustrate hypothetical arrangements of electrical domains in normal and polarized ceramic grains, respectively.
Figure 3A:
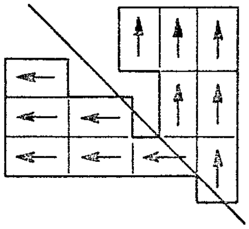
Figs. 3A and 3B illustrate electrical boundary conditions in a polarized ceramic grain.

In a polarized ceramic of a ferroelectric material of the type described, the alignment of roughly one-third of the electrical domains in the principal direction of electrical polarization is explained by the fact that domains normally exist in each of six mutually perpendicular directions. Fig. 2A shows a cross-sectional plane of a ceramic grain with four directional vectors indicated, the other two vectors being assumed to be in opposite directions along a line perpendicular to the plane of the paper. Since the unit crystal cells are two-thirds of a percent longer in the direction of polarization, and one-third of a percent shorter in a direction perpendicular thereto, a strain develops in making the cells fit, as indicated in Fig. 3A, in which this difference in dimension is greatly exaggerated for the purpose of illustration. In the case of single crystals, this strain is known to extend for a few lattice constants into the domains. In a ceramic, X-ray reflections show that there is considerable strain throughout the body of the material.

Figure 4:
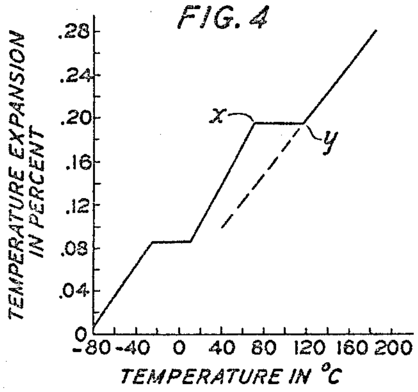
Fig. 4 is a graph showing percentage expansion with temperature of a barium titanate ceramic.

The existence of this strain and its direction are confirmed by the curve shown in Fig. 4, in which "percent expansion of a barium titanate ceramic" is plotted against "degrees centigrade" from −80 to +180. From the Curie temperature, which for barium titanate is 120° centigrade at atmospheric pressure down to 70° centigrade, the ceramic does not change in size, as shown by the almost horizontal portion X—Y of the curve; whereas for the single crystal, a continuous decrease in volume of the unit cell occurs over this temperature range. This indicates that approximately radial extensional stresses are exerted in the domains of the ceramic which reach their maximum values at 70° centigrade.

Figure 2B:
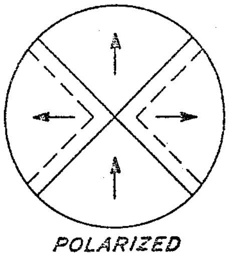
Figure 3B:
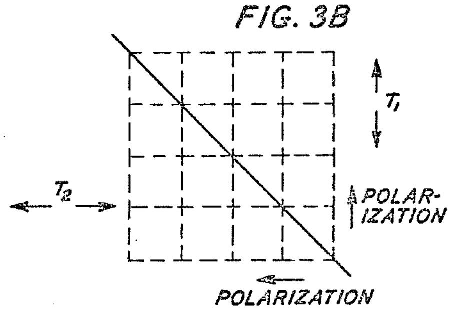
Figure 5A:
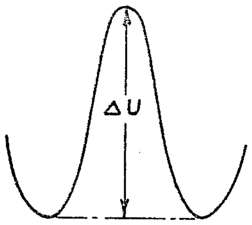
Figs. 5A and 5B illustrate potential energy barriers existing between ceramic cells of the type herein described, in an unpolarized and polarized condition, respectively.
Figure 5B:
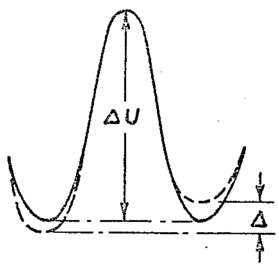

This system of stresses is indicated by the arrows $T_1$ and $T_2$ in Fig. 3B. If the stresses are balanced on both sides of the domain wall, no motion occurs; but if, because of unequal domain sizes, these forces are not balanced, the domain walls are caused to move in such a direction as to equalize the stresses in the ceramic grain, as indicated by the dotted lines in Fig. 2B. This motion results from unit cells changing their direction of polarization across a potential energy barrier $\Delta\mu$, which is estimated from aging experiments to have a peak value of 19 kilocalories per mole. The hypothetical form of such a barrier is indicated for the unpolarized and polarized condition in Figs. 5A and 5B respectively. The dotted lines in Fig. 5B indicate the lowering of the potential well in the direction of polarization. As long as the stresses on the two sides of the domain wall are balanced, the wells on both sides of the main peak are equal, and no motion of the domain wall occurs. If, however, the stress on one side is larger than that on the other, the depth of the well on one side is increased with respect to the other, and the domain wall of individual unit cells will change direction under thermal agitation until the stresses on the two sides are again equalized.

Figure 6:
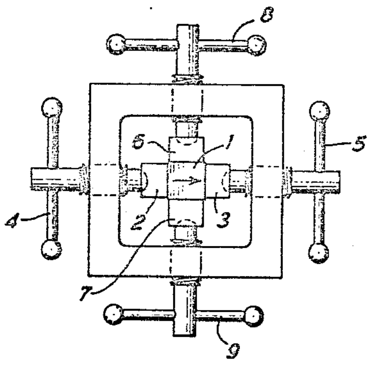
Fig. 6 shows a test apparatus utilized to illustrate the principles of the present invention.

The existence of a stress which can cause domain wall motion in a ceramic of the type described has been verified by putting a pressure of 5,000 pounds per square inch on the ceramic in the direction of polarization. This is carried out in a vise structure such as indicated in Fig. 6 of the drawings. A cubical barium titanate ceramic element 1 polarized in the direction indicated by the arrow was mounted between a pair of steel blocks 2 and 3, so that pressure was applied uniformly to opposing surfaces of sample 1 in the direction of its polarization, by manipulation of set screws 4 and 5. Measurements of the changes in piezoelectric constant of the compressed ceramic 1 indicated that this operation caused the domain walls to move in such a direction as to reduce polarization.

Conversely, tension in the direction of polarization or compression at right angles to the direction of polarization has been found to produce motion of the domain walls in such a direction that the polarized areas become larger. This has also been verified in the vise structure of Fig. 6, using, in addition to the mounting blocks 2 and 3 controlled by set screws 4 and 5, a second pair of mounting blocks 6 and 7, controlled by set screws 8 and 9. These two pairs of blocks, operating simultaneously, apply pressure in a direction normal to the direction of polarization of the cubical barium titanate sample 1, which in this case is perpendicular to the plane of the page. With this arrangement, increases of about forty percent in the energy converting ability of the ceramic were obtained, as indicated by measurements of the piezoelectric constant. However, as soon as the pressure was released, the piezoelectric constant started to decrease at visible rates and eventually returned to the typical temperature-age values.

In order to maintain the efficiency of energy conversion in a transducing element of the type described at a constant high level, it is proposed in accordance with the present invention to apply pressure permanently to the ceramic element in a direction normal to its axis of polarization. A practical device for this purpose, which is shown in Fig. 7, comprises means for applying hydrostatic pressure radially to a cylinder of disk-shaped ceramic elements in a direction normal to the common axis of polarization which runs the length of the cylinder.

Figure 7:
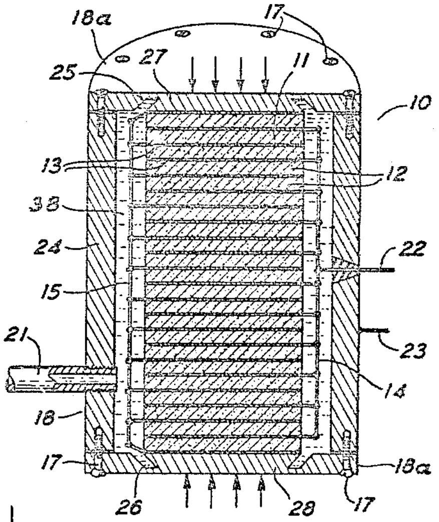
Fig. 7 shows an embodiment of the present invention in which pressure is applied hydraulically to a transducer comprising a cylindrical bank of ferroelectric ceramic elements.

Referring in detail to Fig. 7, the transducer 10 comprises a cylindrical bank 11 of substantially identical disk-shaped ceramic wafers 12, comprising polycrystalline barium titanate which have radii of, say, 2 inches, and a thickness between their major faces of three-eighths of an inch, and which have been processed in the manner previously described. Although, by way of example, barium titanate, $BaTiO_3$, is mentioned as the principal crystalline component of the ceramic elements 12, it will be apparent that any one or a combination of ferroelectric materials mentioned in the previous table may be suitably substituted therefor.

Each of the major faces of the ceramic elements 12 is provided with an electrode coating 13 comprising, for example, silver paint. The elements 12 are then stacked together in cylindrical formation with the silver coatings 13 on the two exposed flat surfaces of the cylinder, and sandwiched between each of the successive pairs of surfaces of the contiguous disks comprising the cylinder. The electrodes are fixed by firing at a temperature between 250° and 1400° Fahrenheit. Alternate ones of electrodes 13 are joined to contacting wires 14 and 15, respectively, to provide oppositely poled electrodes on both sides of each of the elements 12.

A housing 18, in which the cylindrical transducer 11 is mounted, consists of a cylindrical steel, oil tight drum, the curved portion 24 of which has a thickness of, say, one-fourth of an inch. The end portions 18*a* of the housing 18, which are mounted by means of screws 17 on the curved portion 24, respectively, include the steel diaphragms 27 and 28, integral therewith, each having a diametric extent approximating that of the transducer 11, and a Young's modulus approximating $29 \times 10^6$ pounds per square inch. Annular slots 25 and 26 are respectively cut in the upper and lower end portions of housing 18 to permit flexibility in the direction of the arrows. The cylindrical transducer 11 is mounted concentrically in the housing 18 by soldering the exposed electrodes on the upper and lower faces of the cylinder to the diaphragms 27 and 28.

The cylindrical transducer 11 is so positioned that its curved surface is uniformly spaced from the inner surface of the housing 18, forming therewith an annular chamber 38, which serves as a receptacle for hydraulic fluid, such as castor oil or the like. The fluid is admitted through a duct 21, and is maintained at a pressure of between 5 and 10 thousand pounds per square inch by conventional pumping means not shown.

The contacting wire 14, which is common to alternate electrodes 13, is brought out for connection to the terminal 22 through a pressure-tight insulating seal, which may be constructed by any of the methods well known in the art, such as that described on page 43 of P. W. Bridgeman's book "Large Plastic Flow and Fracture," McGraw Hill Co., 1952. The contacting wire 15, which is common to the remaining electrodes 13, is connected to the grounded inner surface of the conducting housing 18, the outer surface of which is connected to the terminal 23.

After the transducer 11 has been soldered into place in the housing 18, it is subjected to prepolarizing treatment. In the case of barium titanate, this can be effected by heating the unit slightly above the Curie temperature (which is 120° at atmospheric pressure) while a voltage of, say, twenty-five volts per thousandths of an inch thickness is applied across the terminals 22 and 23. The temperature is then lowered through the Curie temperature to room temperature. This process produces a permanent polarization in a direction normal to the major surfaces of the elements 12. Other prepolarizing methods known in the art may be employed, depending on the crystalline material used.

In operation, while constant pressure is applied to transducer 11 in a radial direction through the fluid in chamber 38, acoustic signals applied to the diaphragms 27 and 28 cause fluctuations which compress the transducer 11 in the direction of polarization, producing an electrical output across the terminals 22 and 23 which, as stated before, exceeds by as much as forty percent that obtainable by prior art methods.

Figure 8A:
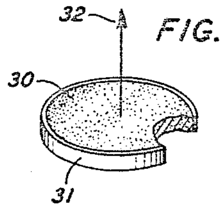
Fig. 8A shows an alternative embodiment of the present invention comprising a disk-shaped wafer of ferroelectric ceramic material including a metal collar shrunk around its periphery.
Figure 8B:
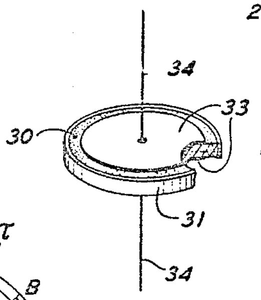
Fig. 8B shows the embodiment of Fig. 8A with electrode attachments.

An alternative embodiment of the invention is disclosed in Figs. 8A and 8B of the drawings, the former showing the unit without electrodes. A ceramic disk 30, comprising barium titanate or the like, is formed in the manner described hereinbefore. The disk 30 is maintained under constant, radially directed pressure, by means of a metal collar 31 shrunk around the periphery of the disk.

In order to insure optimum performance, the material and dimensions of the collar 31 should be selected in accordance with the following theoretical considerations. In preferred form, it should be a metal such as steel, having an activation energy in excess of forty kilocalories per mole, and a coefficient of expansion substantially higher than that of the ceramic.

Figure 8C:
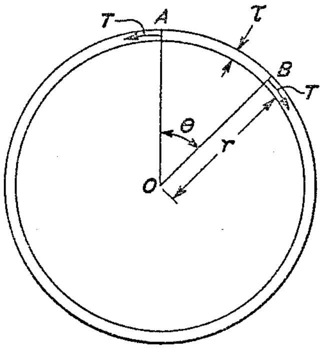
Fig. 8C is a diagram illustrating certain dimensions of the embodiment of Figs. 8A and 8B.

Referring to Fig. 8C of the drawings, the following relationship can be said to hold true for a small sector AOB of the disk 30.

$$pr\theta w = 2Ttw \sin\frac{\theta}{2} \quad (1)$$

where:

$p$=pressure in pounds per square inch
$r$=radius of the ceramic in inches
$\theta$=angle in radians subtended by the sector
$t$= the thickness of the collar in inches in a radial direction
$w$=the width of the ceramic in inches in a direction normal to the major faces; and
T=the maximum allowable tension in pounds per square inch, not exceeding the elastic limit, which is directed circumferentially on the collar.

Since for small angles $\sin\theta=\theta$, Equation 1 becomes:

$$pr\theta w = 2Ttw\frac{\theta}{2} \quad (2)$$

This simplifies to:

$$t=\frac{rp}{T} \quad (3)$$

Assume, in the illustrative embodiment under description, that the radius $r$ of the ceramic disk 30 is 2 inches, and that the collar 31 comprises steel for which the maximum allowable tension in a circumferential direction is 50,000 pounds per square inch (the latter may be as great as 110,000 pounds per square inch with special steels). Then the required radial thickness of the collar 31, in order to maintain a pressure of 10,000 pounds per square inch on the peripheral surface of the ceramic, may be determined by a simple substitution in Equation 3, as follows:

$$t=\frac{2\times 10,000}{50,000}=0.4 \text{ inches}$$

Assuming that the selected steel has a coefficient of expansion of $14\times 10^{-6}$ inches per inch per degree centigrade, and a Young's modulus of $29\times 10^6$ pounds per square inch, the number of degrees which the collar should be heated to provide the desired pressure can be computed as follows:

$$(\tau-\tau_0)\times 14\times 10^{-6}\times 29\times 10^6=50,000 \quad (4)$$

where $\tau$=the final temperature
and $\tau_0$=the initial temperature

From (4)

$$\tau-\tau_0=\frac{50,000}{14\times 10^{-6}\times 29\times 10^6}=123° \quad (5)$$

If $\tau_0$, room temperature, is 30° C., the steel collar is heated to a temperature of 153° centigrade to produce the required tension.

If both the ceramic disk 30 and the steel collar 31 are heated up to the same temperature to avoid shock, then, since the temperature coefficient of expansion of the ceramic is $9\times 10^{-6}$ inches per degrees centigrade, the temperature to which the assemblage is raised can be computed as follows:

$$(\tau-\tau_0)\ (14-9)\times 10^{-6}\times 29\times 10^6=50,000 \quad (6)$$

From (6)

$$(\tau-\tau_0)=\frac{50,000}{5\times 29}=345° \quad (7)$$

Assuming $\tau_0$=30°, then $\tau$ should equal 375° centigrade.

After the collar 31 has been shrunk onto the ceramic disk 30 in the manner described, electrode coatings 33, which may comprise baked-on silver paste, or any of the other forms well known in the art, are applied to the major faces thereof, and lead wires 34 soldered thereto.

The transducer is then prepolarized in a manner such as that previously described by heating it up above a transition temperature, and applying a voltage across the lead wires 34 while it cools slowly to room temperature.

It will be apparent to those skilled in the art that the teachings of the present invention can be embodied in equivalent forms as well as those specifically described herein by way of illustration.

What is claimed is:

1. An electromechanical transducer comprising an element of ferroelectric crystalline material adapted for the interchange of energy between electrical and mechanical forces applied and resulting parallel to each other in a given direction in said material, said material being electrically polarized in said given direction, means for applying one of said forces to said material in said given direction, means for receiving energy of the other of said forces developed in said material in said given direction, and means for applying a substantially constant compressive force to said material in a direction normal to said given direction.

2. An electromechanical transducer comprising an element of ferroelectric crystalline material characterized by perovskite lattice structure and having a definite direction of polarization, means for interconnecting said element with mechanical and electrical systems for the interchange between said systems of forces in the mechanical system exerted in a direction parallel to said direction of polarization with voltages in said electrical system across said element in said direction of polarization, and means for applying a substantially constant compressive force to said element in the direction normal to said direction of polarization.

3. An electromechanical transducer comprising a plurality of similar cylindrical elements each of a ferroelectric crystalline material which is characterized by perovskite lattice structure, said elements each having a thickness small compared to the diameter and having a principal direction of polarization in the thickness direction, electrode layers disposed on both circular surfaces of each element, a cylindrical housing with said elements stacked therein with said electrode layers of adjacent elements in contact with each other, a metallic diaphragm for closing each end of said housing and rigidly joining the surfaces of the top and bottom elements of the stack for the application of variable mechanical forces normal to the circular surfaces of said elements, said housing having a diameter exceeding the diameter of said elements forming a fluid-tight chamber surrounding the stack of elements, means for maintaining a hydraulic fluid under substantially uniform pressure in said fluid-tight chamber to apply a uniform compressional stress to said elements in a radial direction, a pair of electrical terminals, and means for commonly connecting alternate ones of said electrode layers to the respective terminals of said pairs.

4. A transducer in accordance with claim 2 wherein said crystalline material comprises barium titanate.

5. A transducer comprising in combination a ceramic unit including a principal component of ferroelectric crystalline material which is characterized by perovskite lattice structure, said unit having a principal direction of polarization, hydraulic pressurizing means disposed relative to the surface of said unit to apply a substantially constant pressure to said unit only in a direction substantially normal to said principal direction of polarization, and means for interconnecting said unit with mechanical and electrical systems for the interchange between said system of forces in the mechanical system exerted in a direction parallel to said principal direction of polarization with voltages in said electrical system across said unit in said principal direction of polarization.

6. An electromechanical transducer in accordance with claim 2 in which the element of ferroelectric crystalline material is of disk form and the means for applying a substantially constant compressive force comprises a metallic collar shrunk around the periphery of the disk.

References Cited in the file of this patent

UNITED STATES PATENTS

| | | |
|---|---|---|
| 2,138,036 | Kunze | Nov. 29, 1938 |
| 2,434,648 | Goodale | Jan. 20, 1948 |
| 2,486,560 | Gray | Nov. 1, 1949 |
| 2,487,962 | Arndt | Nov. 15, 1949 |
| 2,496,293 | Diernan | Feb. 7, 1950 |
| 2,507,636 | Kistler | May 16, 1950 |
| 2,531,230 | Mason | Nov. 21, 1950 |
| 2,632,634 | Williams | Mar. 24, 1453 |
| 2,636,135 | Peck | Apr. 21, 1953 |
| 2,650,991 | Ketchledge | Sept. 1, 1953 |
| 2,714,672 | Wright | Aug. 2, 1955 |
| 2,726,074 | Ketchledge | Dec. 6, 1955 |
| 2,770,741 | Vore | Nov. 13, 1956 |

OTHER REFERENCES

"Piezotronic Technical Data," 1953, Brush Electronics Co., pages 5, 17, 18 and 19.